(12) United States Patent
Kamiya et al.

(10) Patent No.: US 12,148,455 B2
(45) Date of Patent: Nov. 19, 2024

(54) MAGNETIC HEAD SUSPENSION

(71) Applicant: Suncall Corporation, Kyoto (JP)

(72) Inventors: Yuusuke Kamiya, Kyoto (JP); Yasuo Fujimoto, Kyoto (JP)

(73) Assignee: Suncall Corporation, Kyoto (JP)

(*) Notice: Subject to any disclaimer, the term of this patent is extended or adjusted under 35 U.S.C. 154(b) by 0 days.

(21) Appl. No.: 18/579,263

(22) PCT Filed: Feb. 22, 2023

(86) PCT No.: PCT/JP2023/006509
§ 371 (c)(1),
(2) Date: Jan. 12, 2024

(87) PCT Pub. No.: WO2024/176397
PCT Pub. Date: Aug. 29, 2024

(65) Prior Publication Data
US 2024/0282334 A1    Aug. 22, 2024

(51) Int. Cl.
*G11B 5/48* (2006.01)
(52) U.S. Cl.
CPC .................. *G11B 5/4833* (2013.01)
(58) Field of Classification Search
None
See application file for complete search history.

(56) References Cited

U.S. PATENT DOCUMENTS

| 8,441,760 B2 * | 5/2013 | Fujimoto | G11B 5/4833 |
| | | | 360/244.8 |
| 8,472,144 B2 * | 6/2013 | Fujimoto | G11B 5/4833 |
| | | | 360/244.9 |

FOREIGN PATENT DOCUMENTS

| JP | 2013-218771 A | 10/2013 |
| JP | 5796032 B2 | 10/2015 |
| JP | 2019-192323 A | 10/2019 |
| JP | 2021-144779 A | 9/2021 |
| JP | 2021-190151 A | 12/2021 |
| JP | 7206435 B1 | 1/2023 |

OTHER PUBLICATIONS

Written Opinion of the International Searching Authority issued in International Application No. PCT/JP2023/006509, dated Apr. 18, 2023, 4 pages.

\* cited by examiner

*Primary Examiner* — Carlos Garcia
(74) *Attorney, Agent, or Firm* — Sterne, Kessler, Goldstein & Fox P.L.L.C.

(57) ABSTRACT

In a magnetic head suspension, a main body region of a flexure substrate is fixed to a load beam part at plural welding points including F/L first and second welding points respectively arranged on distal and proximal sides of a position of a LB bending that reduces a gain of a torsion vibration of the load beam part. In a case where a length of a flat region in the suspension longitudinal direction is represented by F, the flat region extending between an end position on the distal side of the bending at the LB bending position and the F/L first welding point is represented by F, and a length between the F/L first welding point and a supporting arm welding point is represented by D, a condition of $0.02 \leq F/D \leq 0.05$ is met.

6 Claims, 10 Drawing Sheets

MAGNETIC HEAD SUSPENSION

TECHNICAL FIELD

The present invention relates to a magnetic head suspension for supporting a magnetic head slider that reads and/or writes data from and to a recording medium such as a hard disk drive.

BACKGROUND

A magnetic head suspension includes a supporting part such as a base plate that has a proximal side directly or indirectly swung around a swinging center by an actuator such as a voice coil motor, a load bending part that has a proximal end portion supported by the supporting part and generates a pressing load for pressing a magnetic head slider toward a disk surface, a load beam part that is supported through the load bending part by the supporting part and transmits the load to the magnetic head slider, and a flexure part that is fixed to the load beam part and supports, at a distal end side, the magnetic head slider while allowing a gimbal movement of the magnetic head slider.

A flexure substrate of the flexure part includes a main region that is fixed to the load beam part in a state of being overlapped with the load beam part, a pair of supporting arms that extend toward a distal side of the suspension from the main region in a state of being free from the load beam part, and a tongue region supported by the pair of the supporting arms.

The tongue region is configured to support the slider at an opposed surface facing the disk surface and come into contact with, at a rear surface on a side away from the disk surface, a dimple formed in the load beam part. The tongue region is directly or indirectly supported by the pair of supporting arms in a cantilever manner so as to perform the gimbal movement in which the tongue is swung in a pitch direction and a roll direction with the dimple as a fulcrum.

The thus configured magnetic head suspension is required to rapidly and accurately have the magnetic head slider positioned on a target track. In order to have the slider rapidly moved to the target track, it is needed to increase a frequency (driving frequency) of a drive voltage for driving the actuator so that a swinging speed of the suspension around the swinging center is increased. However, the increase of the driving frequency causes an unintentional vibration of the suspension so that an accurate positioning of the slider with respect to the target track is inhibited.

In this regard, for example, a patent literature 1, which is mentioned below, proposes a suspension having a load beam part and a flexure part fixed thereto, wherein the load beam part in a state that the flexure part is fixed thereto is bent at a LB bending position in order to reduce a gain of a vibration in the torsion mode.

The suspension described in the patent literature 1 is useful in that the bending of the load beam part at the LB bending position can reduce a tongue region from being fluctuated in a seek direction in accordance with the vibration of the load beam part in the torsion mode (that is, the gain of the vibration of the torsion mode).

Specifically, the load beam part vibrates in the torsion mode around a torsion center line along a suspension longitudinal direction in response to the vibration occurred in the load beam part when being swung by the actuator and/or the air pressure caused by the rotation of the disk.

In the suspension described in the patent literature 1, the angle (magnitude) of the bending at the LB bending position is set so that the torsion center line passes through or comes close to a contact point between the dimple and the tongue region. This configuration prevents the vibration of the tongue region in the seek direction as much as possible even if the load beam part vibrates in the torsion mode around the torsion center line.

As explained above, the suspension described in the paten literature 1 makes it possible to effectively prevent the tongue region from being unintentionally vibrated in the seek direction due to the vibration of the load beam part in the torsion mode. However, the suspension does not take into account the vibration of the flexure part in the torsion mode with respect to the load beam part.

Specifically, as explained above, the tongue region supporting the slider is supported by the supporting arms that are free from the load beam part.

Accordingly, when the suspension is swung by the actuator and/or receives the air pressure caused by the rotation of the disk, the flexure part as a whole vibrates in the torsion mode along with the load beam part with respect to the supporting part, and a part of the flexure that is free from the load beam part vibrates in the torsion mode independently from the load beam part while vibrating in the torsion mode along with the load beam part.

PRIOR ART DOCUMENT

Patent Literature

Patent Literature 1: Japanese Patent No. 5796032

SUMMARY

The present invention has been made in consideration of the conventional technology, and it is an object to provide a magnetic head suspension capable of effectively reducing a gain of a vibration in a torsion mode of a flexure part while reducing a gain of a vibration in the torsion mode of a load beam part.

In order to achieve the object, the present invention provides a magnetic head suspension including an overlapped assembly that has a load beam part and a flexure part fixed to the load beam part, the overlapped assembly being bent at a predetermined LB bending position between distal and proximal ends so that a distal side of the overlapped assembly is separated from a disk surface, wherein the flexure part has a metal flexure substrate plate, wherein the flexure substrate plate has a main body region fixed to the load beam part, a pair of right and left supporting arms extending toward a distal side from the main body region in a state of being free from the load beam part, and a tongue region supported directly or indirectly by the supporting arms, wherein the main body region is fixed to the load beam part at plural welding points including F/L first and second welding that are arranged on distal and proximal sides of the LB bending position in a suspension longitudinal direction, respectively, wherein the pair of supporting arms have distal ends that are fixed to the load beam part at a supporting arm welding point arranged on a distal side of the tongue region in the suspension longitudinal direction, wherein the tongue region is arranged between the F/L first welding point and the supporting arm welding point in the suspension longitudinal direction, and is configured to have a lower surface, which faces the disk surface, supporting the magnetic head slider and an upper surface, which is opposite from the disk surface, brought into contact with a dimple provided in the load beam part, and wherein, in a case where a length in the suspension longitudinal direction of a flat region is represented by F, the flat region extending between an end position on the distal side in the suspension longitudinal direction of the bending at the LB bending position and the F/L first welding point, and a length in the suspension longitudinal direction between the F/L first welding point and the supporting arm welding point is represented by D, a condition of $0.02 \leq F/D \leq 0.05$ is met.

The magnetic head suspension according to the present invention makes it possible to effectively reduce the gain of the vibration in the torsion mode of the flexure part while reducing the gain of the vibration in the torsion mode of the load beam part.

The magnetic head suspension according to the present invention is preferably configured so that a condition of $0.04 \leq F/D \leq 0.05$ is met.

In one embodiment, the load beam part is configured to include a plate-like main body portion having a width that is gradually reduced from a proximal side to a distal side in the suspension longitudinal direction, and a pair of right and left flange portions extending from both side edges of the main body portion in a suspension width direction toward a direction away from the disk surface.

In this embodiment, the main body region may be fixed to the main body portion at the F/L first and second welding points, and the pair of supporting arms may be fixed to the main body portion at the supporting arm welding.

In a preferable configuration, the supporting arm welding is arranged on the suspension longitudinal center line.

In a preferable configuration, the F/L first welding point includes a pair of welding points arranged symmetrically with respect to the longitudinal center line CL.

In a preferable configuration, the pair of supporting arms each have a bending portion that has a convex shape towards the disk surface and is arranged on a proximal side of the tongue region in the suspension longitudinal direction.

BRIEF DESCRIPTION OF THE DRAWINGS

FIG. 6 is a graph of a result of a verification 1 performed on an example of the magnetic head suspension, and shows a relationship between F/D and ratio of A with respect to distance L in a case where a length of a flat region is represented by F, the flat region extending between an end position of a bending at a LB bending position and a F/L first welding point that is arranged on a most distal side among plural welding points at which a main body region of a flexure substrate plate and a LB main body portion are fixed to each other, a length between the F/L first welding points and a supporting arm welding point at which distal ends of the pair of supporting arms of the flexure substrate plate and the LB main body portion are fixed to each other is represented by D, a length between a distal edge of a supporting part and a dimple is represented by L, and a length between the distal edge of the supporting part and a flexure separating start position at which the flexure substrate plate starts separating from the LB main body portion is represented by A.

EMBODIMENT FOR CARRYING OUT THE INVENTION

Hereinafter, a preferred embodiment of a magnetic head suspension according to the present invention will be described, with reference to the attached drawings.

Figure 1A:
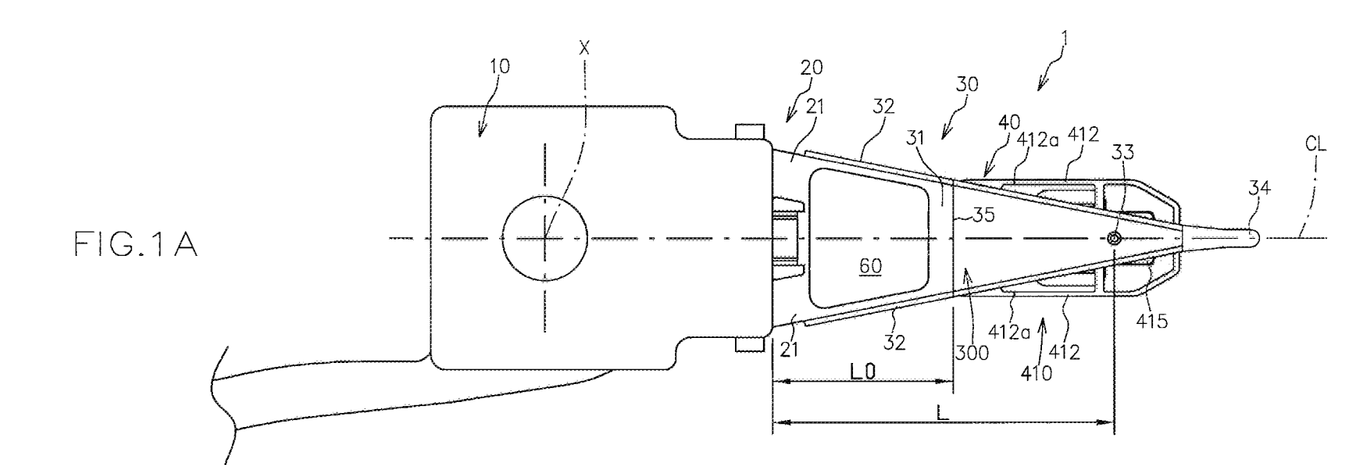
FIGS. 1A and 1B are a plan view and a side view of a magnetic head suspension according to one embodiment of the present invention, respectively.
Figure 1B:
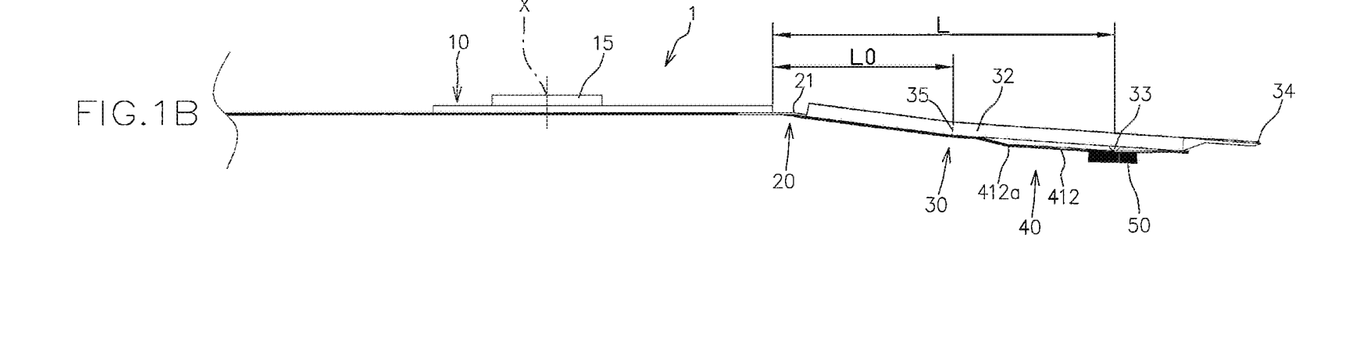

FIGS. 1A and 1B are a plan view (a top view as viewed from a side opposite from a disk surface) and a side view of a magnetic head suspension 1 according to the present embodiment, respectively.

Figure 2A:
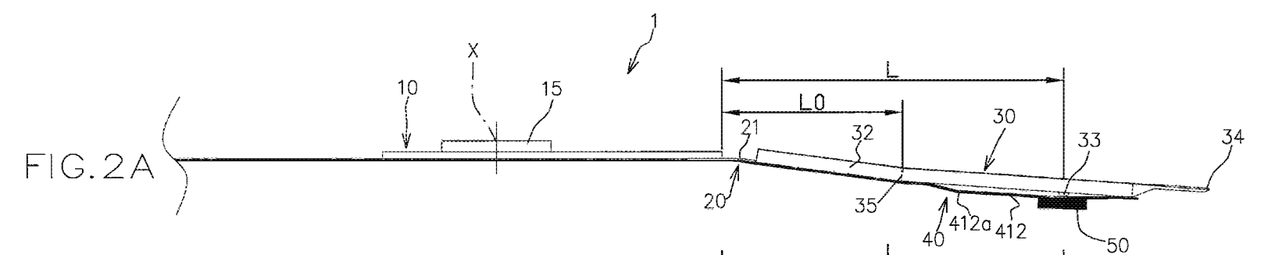
FIGS. 2A and 2B are the side view and a bottom view of the magnetic head suspension, respectively.
Figure 2B:
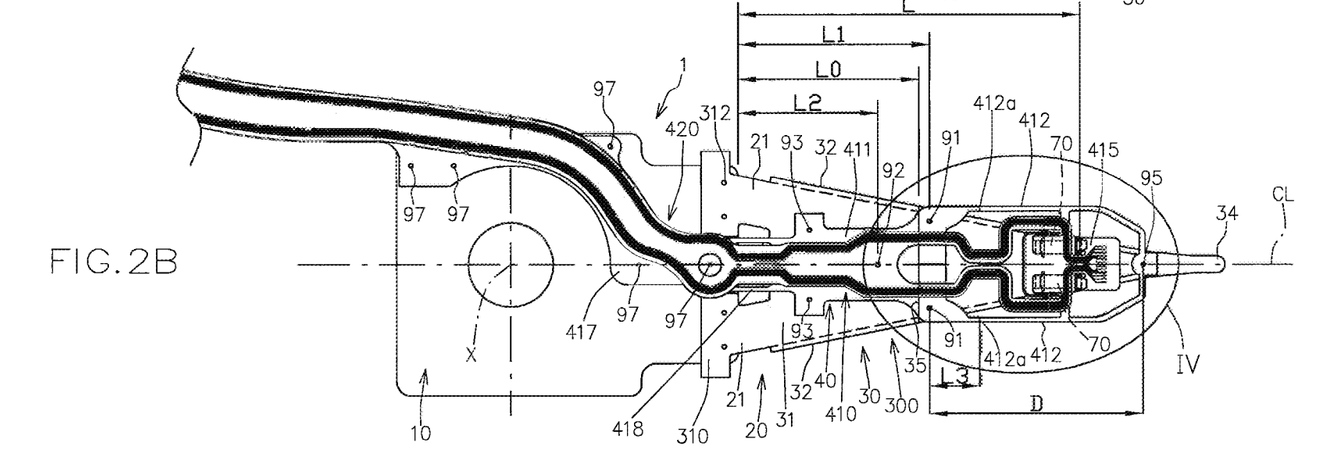

Also, FIGS. 2A and 2B are the side view and a bottom view (a lower side view as viewed from the disk surface) of the magnetic head suspension 1, respectively.

Figure 3:
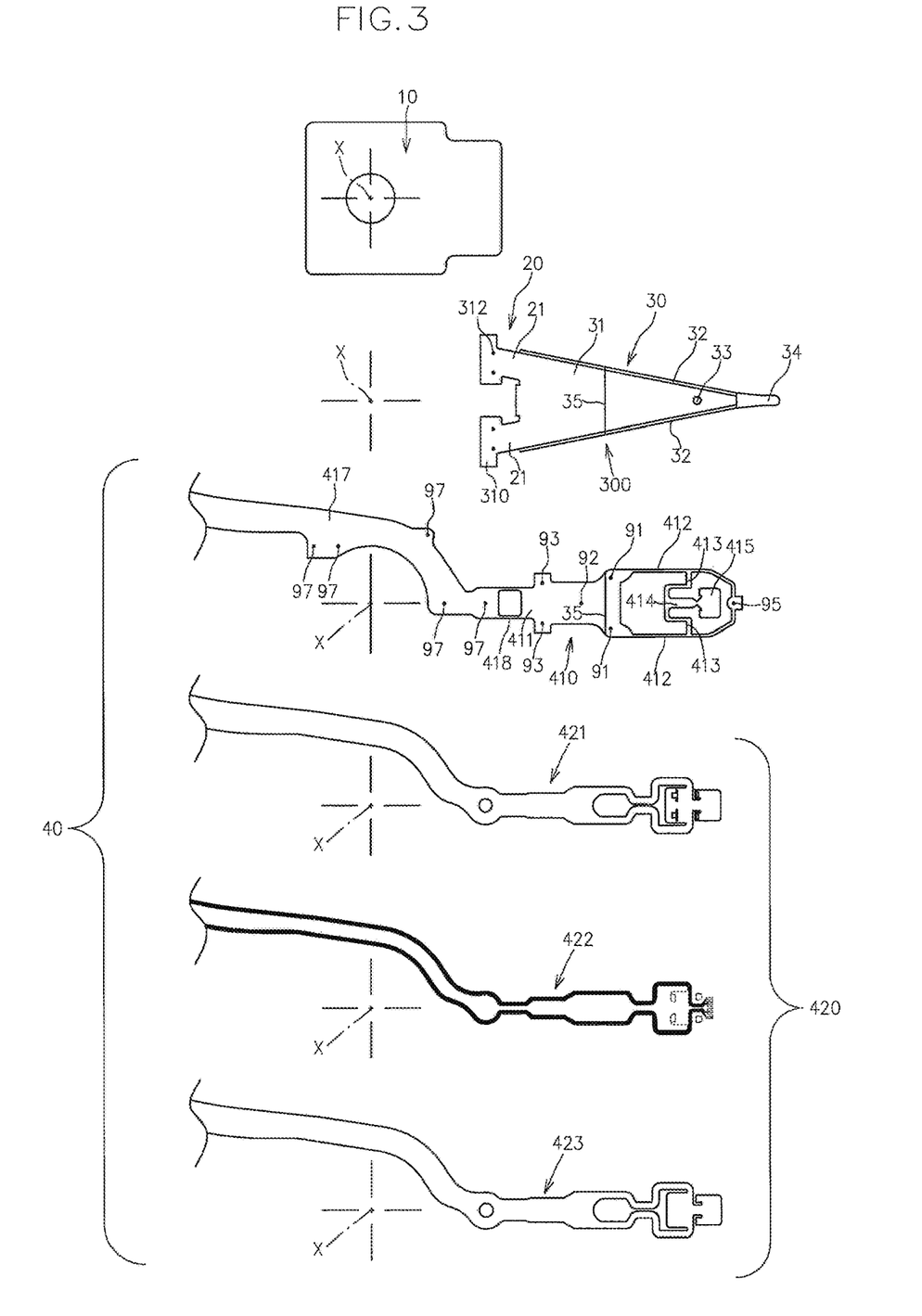
FIG. 3 is an exploded plan view of components of the magnetic head suspension.

Further, FIG. 3 is an exploded plan view (a top view as viewed from the side opposite from the disk surface) of components, which is explained below, of the suspension 1.

As shown in FIGS. 1 to 3, the magnetic head suspension 1 includes a supporting part 10 that is swung around a swinging center X in a seek direction parallel to the disk surface directly or indirectly by a main actuator (not shown) such as a voice coil motor, a load bending part 20 having a proximal end portion that is connected to the supporting part 10 so as to generate a load for pressing a magnetic head slider 50 toward the disk surface, a load beam part 30 that is supported through the load bending part 20 by the supporting part 10 and transmits the load that is generated by the load bending part 10 to the magnetic head slider 50, and a flexure part 40 that is supported by the load beam part 30 while supporting the magnetic head slider 50.

As shown in FIG. 2B, the magnetic head suspension 1 according to the present embodiment further includes a plurality of piezoelectric elements 70 functioning as a sub actuator.

The pair of piezoelectric elements 70 are configured to swing a tongue region 415, which is explained below, of the flexure part 40 in a seek direction around a dimple 33, which is also explained below.

The supporting part 10 is a member for supporting the load beam part 30 through the load bending part 20 while being directly or indirectly connected to the main actuator, and is therefore made so as to have relatively high rigidity.

In the present embodiment, as shown in FIGS. 1 to 3, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.08 mm to 0.3 mm.

It is of course possible to utilize, as the supporting part 10, an arm having a proximal end that is connected to the swing center of the main actuator.

Figure 4:
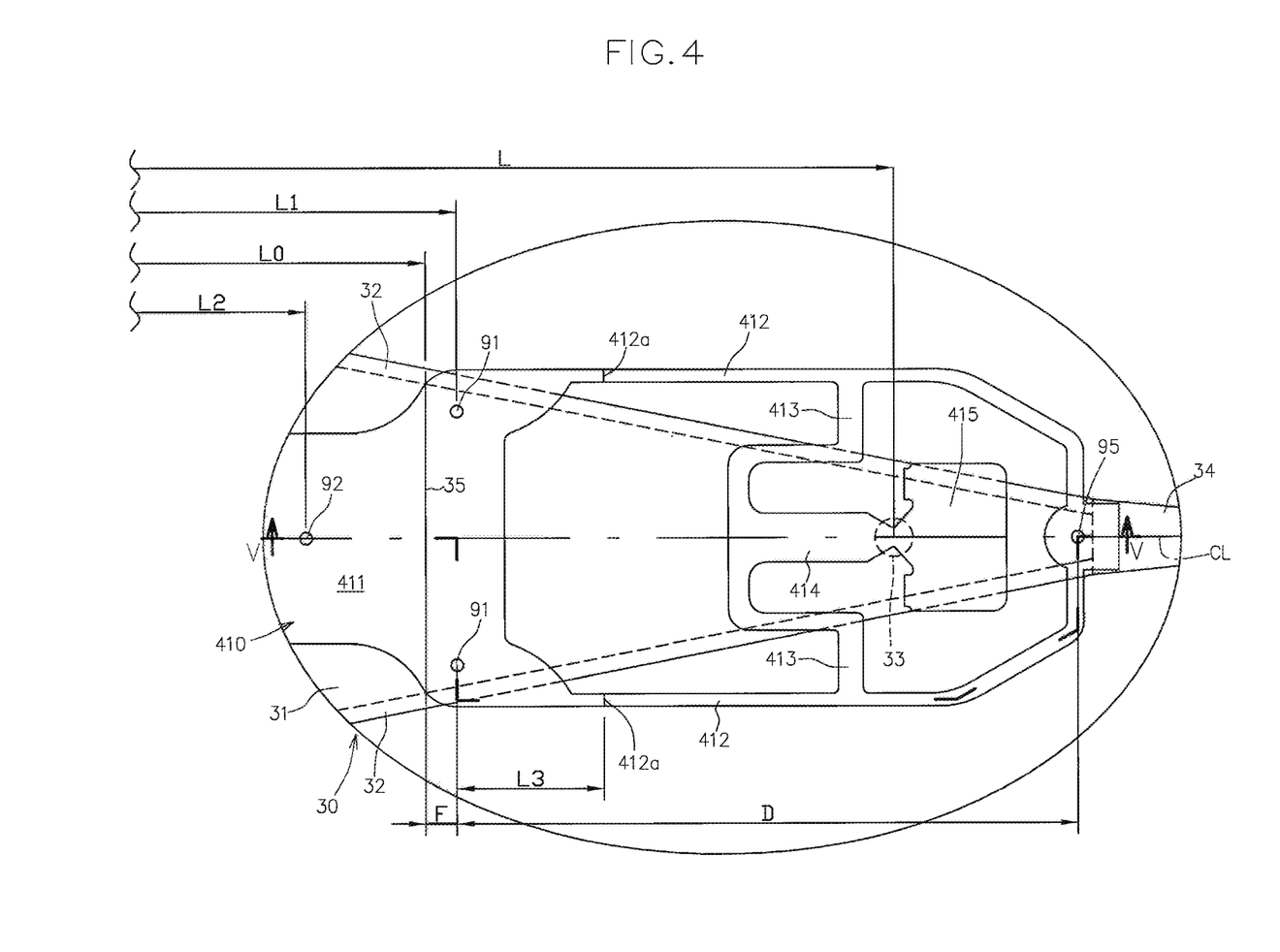
FIG. 4 is an enlarged view of a part IV in FIG. 2B.

FIG. 4 is an enlarged view of a part IV in FIG. 2B.

For easily understanding, in FIG. 4, the pair of piezoelectric elements 70 and a trace structure 420, which is explained below, of the flexure part 40 are omitted.

Figure 5:
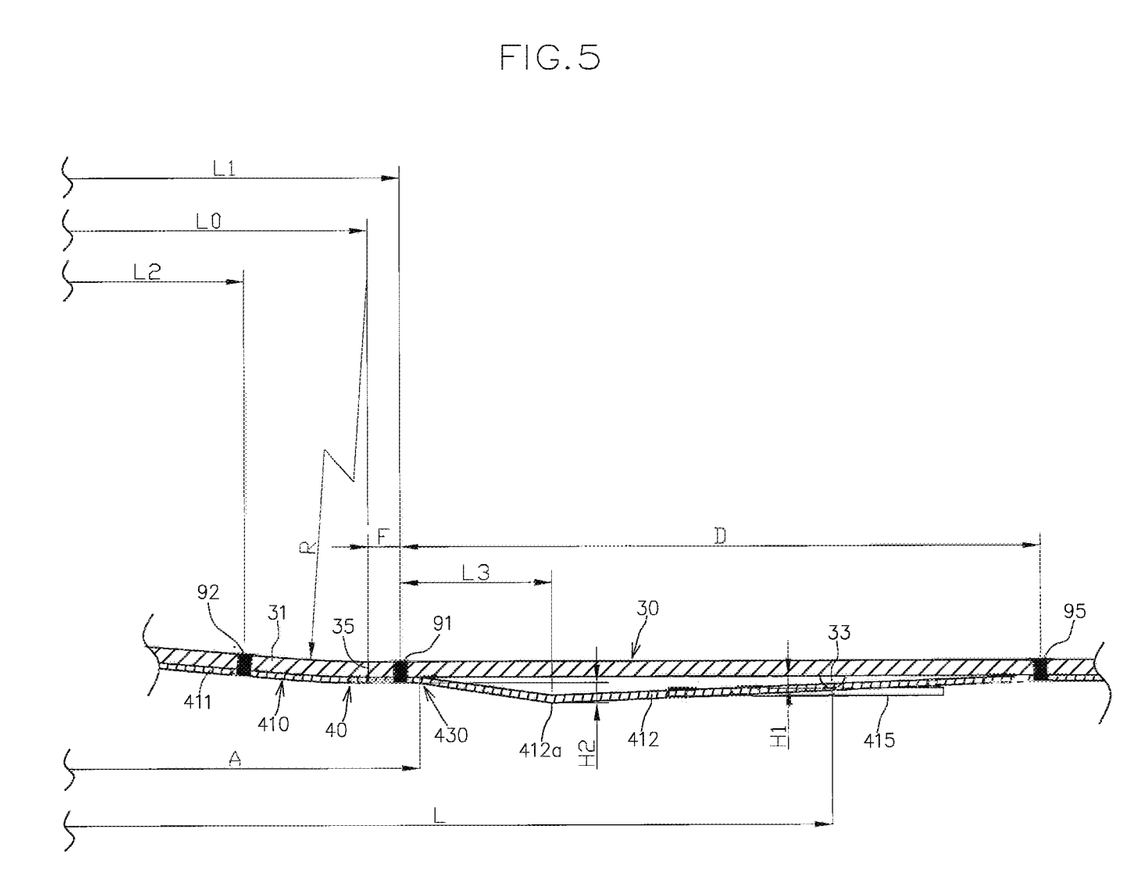
FIG. 5 is a cross-sectional view along line V-V in FIG. 4.

FIG. 5 is a cross-sectional view along line V-V in FIG. 4.

As explained above, the load beam part 30 is a member for transmitting the load generated by the load bending part 20 to the magnetic head slider 50, and therefore is required to have a predetermined rigidity.

As shown in FIGS. 1 to 5, the load beam part 30 has a plate-like LB main body portion 31 that faces the disk surface and paired right and left flange portions 32 that extend from both side edges of the LB main body portion 31 in a suspension width direction toward a direction away from the disk surface, and secures the rigidity by the flange portions 32.

The load beam part 30 may be preferably made from, for example, a stainless plate having a thickness of 0.02 mm to 0.1 mm.

As shown in FIGS. 1 to 5, the load beam part 30 further includes a protrusion 33, which is so-called dimple, at its distal end section.

The dimple 33 is protruded by, for example, about 0.05 mm to 0.1 mm, in a direction toward or close to the disk surface. The dimple 33 is brought into contact with an upper surface (a reverse surface opposite from a supporting surface that supports the magnetic head slider 50) of the tongue region 415, which is mentioned below, of the flexure part 40. The load that is generated by the load bending part 20 is transmitted to the tongue region 415 of the flexure part 40 through the dimple 33.

In the present embodiment, as shown in FIGS. 1 to 5, the load beam part 30 further integrally includes a lift tab 34 that extends from a distal end of the LB main body portion 31 toward the distal side in the suspension longitudinal direction. The lift tab 34 is a member that engages with a lamp provided in a magnetic disk device so as to cause the magnetic head suspension 50 to be away upward from the disk surface at the time when the magnetic head suspension 1 is swung by the main actuator so that the magnetic head slider 50 is positioned outward from the disk surface in a radial direction.

In the present embodiment, as shown in FIGS. 1 to 3, the LB main body portion 31 is gradually reduced in width from a proximal side to a distal side in the suspension longitudinal direction. That is, an outer edge of the LB main body portion 31 in the suspension width direction is inclined so as to come close to a suspension longitudinal center line CL from the proximal side to the distal side in the suspension longitudinal direction.

The thus configuration makes it possible to reduce a moment of inertia of the distal side of the load beam part 30 about the center line CL so as to raise a resonant frequency in the torsion mode.

In the present embodiment, the load bending part 20 includes a pair of right and left leaf springs 21 that are symmetrically arranged in the suspension width direction with the center line CL as a reference in a state that there is a space between the pair of right and left leaf springs 21.

The leaf spring 21 has a proximal end portion connected to the distal side of the supporting part 10 and a distal end portion connected to the load beam part 30 in a state where a plate surface faces the disk surface.

The load bending part 20 is made from, for example, a stainless steel plate having a thickness of 0.02 mm to 0.1 mm.

As shown in FIGS. 1A, 2B and 3, in the present embodiment, the load bending part 20 and the load beam part 30 are integrally formed by a single load beam forming member 300.

Specifically, the load beam forming member 300 integrally includes a portion forming the load beam part 30, a portion extending toward the proximal side from the portion forming the load beam part 30 and forming the load bending part 20 (the pair of leaf springs 21 in the present embodiment), and a supporting part overlapping portion 310 (see FIGS. 2B and 3) extending toward the proximal side from the portion forming the load bending part 20 and fixed to the supporting part 10 by laser spot welding at welding points 312 in a state of being overlapped with the supporting part 10.

The flexure part 40 is fixed to the load beam part 30 by laser spot welding at welding points while supporting the magnetic head slider 50.

Specifically, the flexure part 40 includes a flexure substrate plate 410 fixed to the LB main body portion 31.

The flexure substrate plate 410 has rigidity lower than that of the load beam part 30, and is preferably made from, for example, a metal plate such as a stainless plate having a thickness of 0.01 mm to 0.025 mm.

The flexure substrate plate 410 includes a main body region 411 fixed to the load beam part 30, a pair of supporting arms 412 extending toward the distal side from the main body region 411 in a state of being free from the load beam part 30, and the tongue region 415 supported directly or indirectly by the supporting arms 412.

The main body region 411 is overlapped with and fixed to the LB main body portion 31 by laser spot welding at plural F/L welding points.

As shown in FIGS. 2B and 3 to 5, the plural F/L welding points include F/L first welding points 91, a F/L second welding point 92 and F/L third welding points 93 that are arranged in this order from the distal side to the proximal side in the suspension longitudinal direction.

The F/L first welding points are a pair of welding points arranged symmetrically with respect to the center line CL, the F/L second welding point is a single welding point arranged on the center line CL, and the F/L third welding points are a pair of welding points arranged symmetrically with respect to the center line CL.

In the present embodiment, as shown in FIGS. 2B and 3, the main body region 411 includes a load beam part overlapping site overlapped with the LB main body portion 31 and fixed to the load beam part 30 at the plural welding points 91 to 93, a supporting part overlapping site 417 overlapped with the supporting part 10, and a connecting site 418 connecting between the load beam part overlapping site and the supporting part overlapping site 417 and extending through the space between the pair of leaf springs 21

The supporting part overlapping site 417 is fixed to the supporting part 10 by spot welding at a plural of F/S welding points 97.

The pair of supporting arms 412 have distal ends that are fixed to a distal end portion of the LB main body portion 31 by laser spot welding at a supporting arm welding point 95 arranged on a distal side of the tongue region 415 in the suspension longitudinal direction.

The tongue region 415 is configured to be arranged between the F/L first welding points 91 and the supporting arm welding point 95 in the suspension longitudinal direction, and have a lower surface, which faces the disk surface, supporting the magnetic head slider 50 and an upper surface, which is opposite from the disk surface, brought into contact with the dimple 33.

As shown in FIG. 5, each of the pair of supporting arms 412 has a bending portion 412a having a convex shape towards the disk surface at a predetermined bending position that is arranged on a proximal side of the tongue region 415 in the suspension longitudinal direction.

Providing the bending portion 412a and adjusting a bending angle of the bending portion 412a makes it possible to increase a force (dimple preload) that presses the tongue region 415 toward the dimple 33, and also perform fine adjustment of a profile (shape) of the supporting arms 412 relative to the load beam part 30 to reduce the vibration in the torsion mode of the flexure part. Although the bending angle may be slightly different in accordance with specifications, the angle is preferably set to 0.5-5 degrees.

In the present embodiment, as shown in FIG. 4, the flexure substrate plate 410 includes a pair of extending arms 413 that extend inwards in the suspension width direction from intermediate portions of the pair of supporting arms 412 in the longitudinal direction, and a connecting arm 414 supported by the pair of extending arms 413 so as to extend along the suspension longitudinal direction on the center line CL. The tongue region 415 is supported by the connecting arm 414 in a cantilever manner so as to perform a gimbal movement in which the tongue region 415 is swung in a pitch direction and a roll direction with the dimple 33 acting as a fulcrum.

In the present embodiment, the flexure part 40 has a trace structure 420 including a conductive trace 422 for electrically connecting the magnetic head slider 50 to an outside member.

As shown in FIG. 3, the trace structure 420 includes an insulating layer 421 laminated on a disk-opposing surface of the flexure substrate plate 410, the conductive trace 422 laminated on a disk-opposing surface of the insulating layer 421, and an insulative cover layer 423 enclosing the conductive trace 422.

As shown in FIG. 1A, the magnetic head suspension 1 further includes a damper 60 fixed to a rear surface of the LB main body portion 31 that is on an opposite side from the disk surface.

The damper 60 may include a first layer (not shown) made from a viscoelastic material and fixed to the rear surface of the LB main body portion 31 that is on an opposite side from the disk surface, and a second surface (not shown) fixed to a rear surface of the first layer that is on an opposite side from the disk surface Acrylic polymer, silicon or the like are preferably used for a material of the first layer. A metal material such as stainless steel and aluminum, or resin material such as polyethylene terephthalate is preferably used for a material of the second layer.

As shown in FIGS. 1 to 5, in the magnetic head suspension 1, a overlapped assembly in which the flexure part 40 and the load beam part 30 are fixed to each other is bent at a predetermined LB bending position 35 so as to form a convex shape toward the disk surface (that is, so that a distal side of the load beam part is separated from the disk surface).

An angle (amount) of the bending at the LB bending position 35 is set so that a center line of the vibration in the torsion mode occurred in the magnetic head suspension 1 is come close to a top of the dimple 33 (a contact point of the dimple 33 and the tongue region 415) as much as possible.

Although the bending angle at the LB bending position 35 is set in accordance with the specification, it may be set within a range of 0.5-3.0 degrees.

Even if the vibration in the torsion mode occurs in the magnetic head suspension 1, the bending of the overlapped assembly at the LB bending position 35 makes it possible to prevent or reduce change of an attitude of the tongue region 415 due to the vibration, thereby preventing a positional deviation of the magnetic head slider 50 from a target track as much as possible.

When the magnetic head suspension 1 is swung by the main actuator and/or the sub actuator, and/or, when the suspension 1 receives the air pressure caused by the rotation of the disk in a state of having the slider 50 arranged above the target track, the overlapped assembly of the load beam part 30 and flexure part 40 vibrates in the torsion mode with respect to the supporting part 10 (torsional vibration of the load beam part), and a portion of the flexure part 40 that is free from the load beam part 30 vibrates in the torsion mode with respect to the load beam part 30 (torsional vibration of the flexure part).

Unintentional change of the attitude of the tongue region 415 due to the vibration in the torsion mode of the load beam part 30 can be prevented as much as possible by adjusting the amount of the bending of the overlapped assembly at the LB bending position 35.

However, unintentional change of the attitude of the tongue region 415 due to the vibration in the torsion mode of the flexure part 40 cannot be prevented or reduced by adjusting the amount of the bending of the overlapped assembly at the LB bending position 35

Regarding this point, the inventors of the present application came up with a new hypothesis that unintentional change of the attitude of the tongue region 415 due to the vibration in the torsion mode of the flexure part 40 may be significantly affected by degree of adhesion between the LB main body portion 31 and the main body region 411 of the flexure part 40, which should be ideally brought into close contact to each other.

Specifically, as described above, unintentional change of the attitude of the tongue region 415 due to the vibration in the torsion mode of the load beam part 30 can be prevented or reduced by adjusting the bending angle of the overlapped assembly so that the torsion center line passes through or comes close to the top of the dimple 33.

However, the overlapped assembly is formed by having the LB main body portion 31 and the flexure substrate plate 410, which are different in thickness, to each other by way of welding at the plural F/L welding points 91 to 93 in a state that they are overlapped. Accordingly, when the overlapped assembly is bent, a radius of curvature of the LB main body portion 31 and that of the flexure substrate plate 410 become different from each other.

In this configuration, the flexure substrate plate 410, which is thinner than the LB main body portion 31, is fixed to the LB main body portion 31 so as to be restrained at the plural F/L welding points 91 to 93 while being pulled at the remaining region by the bending of the LB main body portion 31 due to the difference in the radius of curvature between them.

Considering this point, the inventors of the present application came up with the new hypothesis that a portion (a portion on a distal side of the F/L first welding points 91) of the main body region 411 of the flexure substrate plate 410, which should be ideally in close contact with the LB main body portion 31, may be unintentionally deformed and the degree of adhesion of the main body region 411 with respect to the LB main body portion 31 may be impaired so as to cause unintentional change of the profile of the pair of supporting arms 412, resulting in worsening of the gain of the vibration in the torsion mode of the tongue region 415 that is supported by the supporting arms 412, the extending arms 413 and the connecting arm 414. The inventors performed following verifications in order to confirm whether or not the hypothesis is correct.

Verification 1

There were formed six overlapped assemblies (hereinafter referred to as examples 1 (a1) to 1 (a6)) each having the load beam part 30 and the flexure part 40 overlapped thereon and bent with a curvature radius R of 6.5 mm (see FIG. 5) while having a following basic configuration.

Basic Configuration

Thickness of the load beam part 30: 30 μm

Thickness of the flexure substrate plate 410: 18 μm

Distance L between a distal edge of the supporting part 10 and the dimple 33: 6.0 mm Distance L0 between the distal edge of the supporting part 10 and the LB bending position 35: 3.12 mm (=0.52*L)

Distance L1 between the distal edge of the supporting part 10 and the F/L first welding point 91: 3.36 mm (=0.56*L)

Distance L2 between the distal edge of the supporting part 10 and the F/L second welding point 92: 2.4 mm (=0.4*L)

Distance D between the F/L first welding points 91 and the supporting arm welding point 95: 3.75 mm Height H1 of the dimple 33: 0.075 mm Distance L3 between the F/L first welding points 91 and the bending portion 412a: 3.75 mm (=0.2*D)

Height H2 of the bending portion 412a: 0.098 mm (=1.3*H1)

In each of the examples 1 (a1) to 1 (a6), F/D was measured, wherein F denotes a length in the suspension longitudinal direction of a flat region extending between an end position on the distal side in the suspension longitudinal direction of the bending at the LB bending position 35 and the F/L first welding points 91, and D denotes the length in the suspension longitudinal direction between the F/L first welding point 91 and the supporting arm welding point 95 (see FIG. 5).

The results were as follows.

Example 1 (a1): 0.014
Example 1 (a2): 0.016
Example 1 (a3): 0.003
Example 1 (a4): 0.011
Example 1 (a5): 0.007
Example 1 (a6): 0.007
Example 1 (average): 0.010

In each of the examples 1 (a1) to 1 (a6), distance A between the distal edge of the supporting part 10 and a flexure separating start position 430 (see FIG. 5) at which the flexure substrate plate 410 starts separating from the LB main body portion 31 was measured, and ratio of A with respect to distance L which is a distance between the distal edge of the supporting part 10 and the dimple 33 was calculated.

Figure 6:
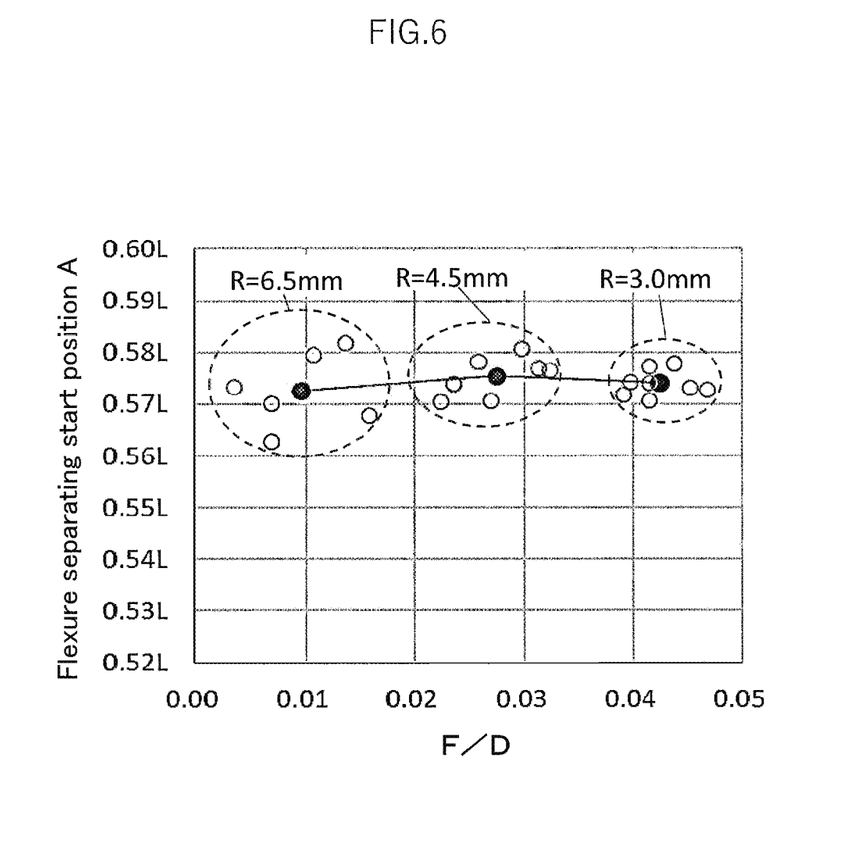

FIG. 6 shows a relationship between F/D and A in each of the examples 1 (a1) to 1 (a6).

There were formed seven examples 2 (hereinafter referred to as examples 2 (a1) to 2 (a7)) having the curvature radius R of the bending at the LB bending position 35 that was changed to 4.5 mm while having the basic configuration.

In each of the examples 2 (a1) to 2 (a7), F/D was measured.

The results were as follows.

Example 2 (a1): 0.030
Example 2 (a2): 0.026
Example 2 (a3): 0.031
Example 2 (a4): 0.022
Example 2 (a5): 0.027
Example 2 (a6): 0.024
Example 2 (a7): 0.032
Example 2 (average): 0.027

In each of the examples 2 (a1) to 2 (a7), A was calculated as ratio with respect to L. The result is also shown in FIG. 6.

There were formed eight examples 3 (hereinafter referred to as examples 3 (a1) to 3 (a8)) having the curvature radius R of the bending at the LB bending position 35 that was changed to 3.0 mm while having the basic configuration.

In each of the examples 3 (a1) to 3 (a8), F/D was measured.

The results were as follows.

Example 3 (a1): 0.039
Example 3 (a2): 0.041
Example 3 (a3): 0.041
Example 3 (a4): 0.040
Example 3 (a5): 0.047
Example 3 (a6): 0.041
Example 3 (a7): 0.044
Example 3 (a8): 0.045
Example 3 (average): 0.042

In each of the examples 3 (a1) to 3 (a8), A was calculated as ratio with respect to L. The result is also shown in FIG. 6.

As shown in FIG. 6, there is a variation in the distance A, which is the length until the flexure separating start position 430, in the vicinity where F/D is 0.01, and, on the other hand, the variation of the distance A is reduced in a case where F/D is equal to or more than 0.02.

The variation of the flexure separating start position causes nonuniformity in gimbal characteristic among magnetic head suspensions having the same dimension. In accordance with this verification, it can be understood that the configuration where F/D is equal to or more than 0.02 is preferable.

Verification 2

In each of the examples 1 (a1) to 1 (a6), the examples 2 (a1) to 2 (a7), and the examples 3 (a1) to 3 (a8), the resonance frequencies in the first and second torsion modes of the flexure part 40 were measured.

Figure 7:
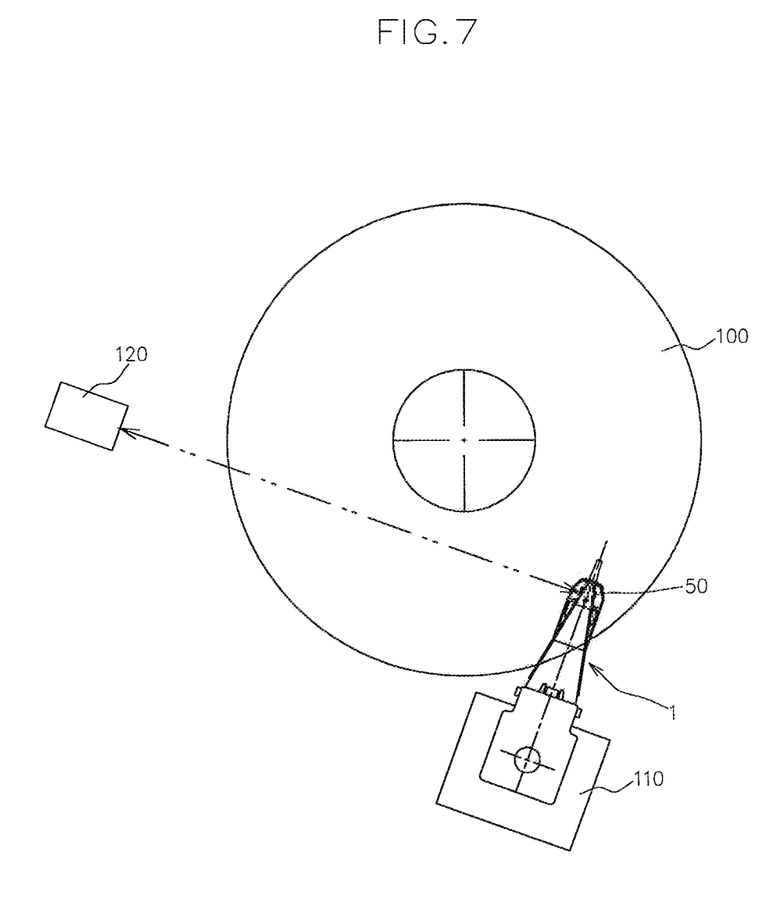
FIG. 7 is a schematic plan view showing a measuring method of a verification 2 performed on the example of the magnetic head suspension.

FIG. 7 is a schematic plan view showing a measuring method of the verification 2.

As shown in FIG. 7, in the verification 2, each of the examples 1 to 3 in a state where the magnetic head slider 50 is mounted thereto is fixed to a jig 110 so that the magnetic head slider 50 is positioned above a 3.5-inch disk surface 100.

A displacement amount of the magnetic head slider 50, which is vibrated by an air pressure supplied from the disk surface 100 when it is rotated at 10,000 rpm, is measured by a laser doppler type displacement measuring apparatus 120, and then a measured time-reference signal is converted to a frequency-reference signal to calculate the resonance frequencies in the first and second torsion modes of the flexure part 40.

Figure 8:
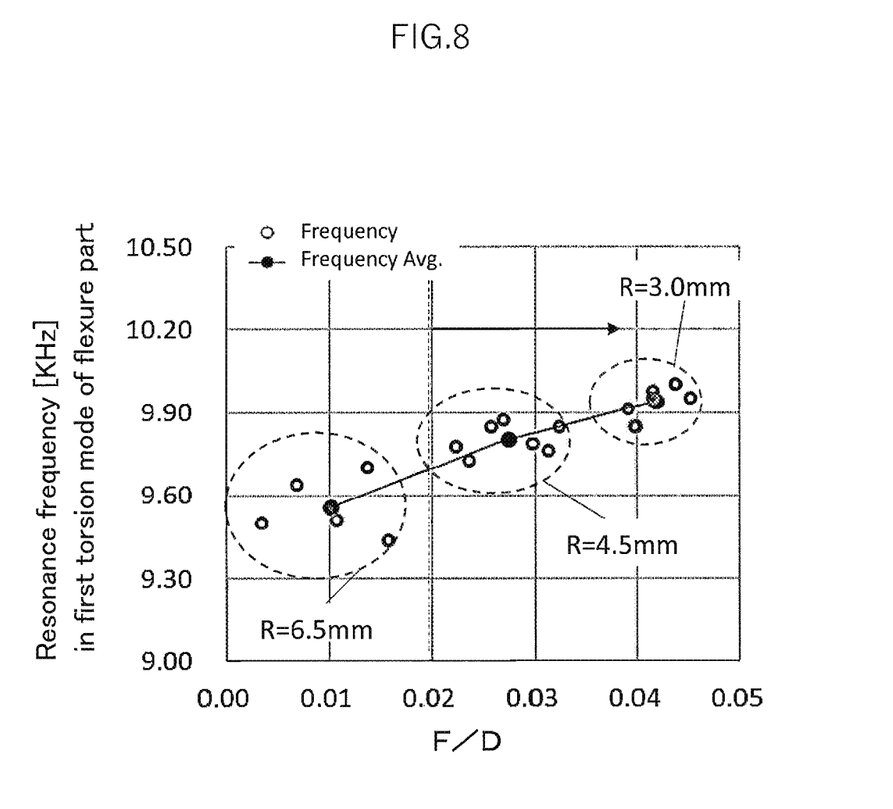
FIG. 8 is a graph of a result of the verification 2, and shows a relationship between F/D and the resonance frequency in the first torsion mode of the flexure part.

FIG. 8 shows a relationship between F/D and the resonance frequency in the first torsion mode of the flexure part 40.

It is understandable from FIG. 8 that the resonance frequency in the first torsion mode of the flexure part 40 is increased and the variation of vibration characteristic of the first torsion mode is suppressed as F/D becomes larger.

Figure 9:
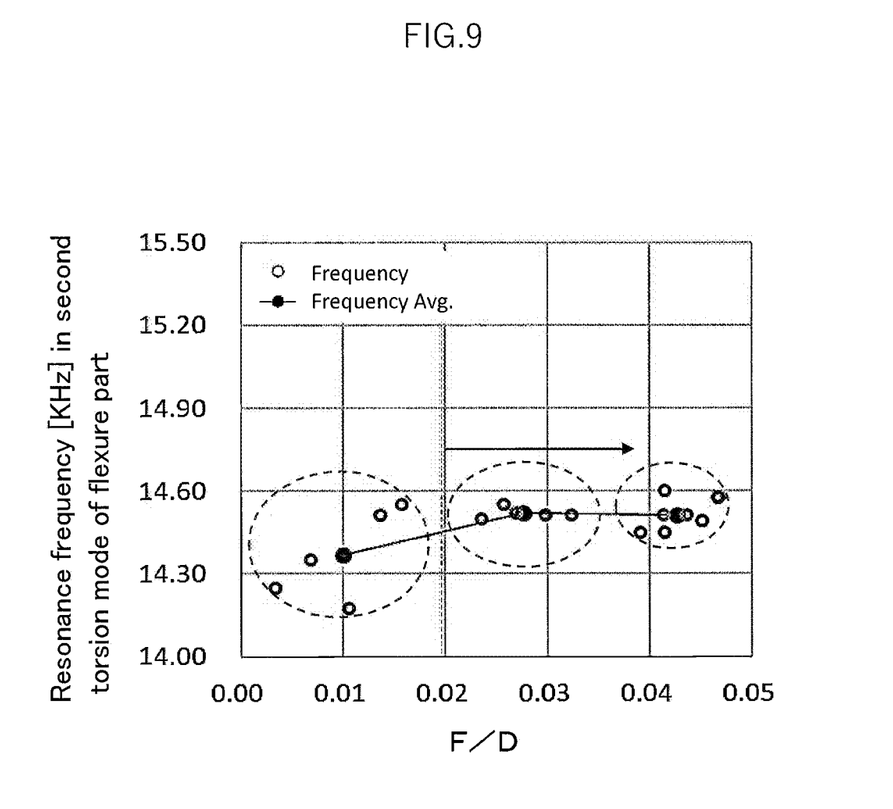
FIG. 9 is a graph of a result of the verification 2, and shows a relationship between F/D and the resonance frequency in the second torsion mode of the flexure part.

FIG. 9 shows a relationship between F/D and the resonance frequency in the second torsion mode of the flexure part 40.

It is understandable from FIG. 9 that variation occurs in the resonance frequency in the second torsion mode of the flexure part 40 when F/D is 0.01, and the resonance frequency in the second torsion mode of the flexure part 40 is increased and the variation of resonance frequency in the second torsion mode is suppressed when F/D is equal to or more than 0.02.

From FIGS. 8 and 9, it is understandable that setting F/D to be equal to or more than 0.02 is preferable in a view point of the resonance frequencies in the first and second torsion modes of the flexure part 40.

Verification 3

In each of the examples 1 (a1) to 1 (a6), the examples 2 (a1) to 2 (a7), and the examples 3 (a1) to 3 (a8), analyses regarding the roll rigidity and the pitch rigidity of the tongue region 415 by using a finite element method (FEM) were performed.

Regarding the pitch rigidity, in each of the models of the examples 1 to 3 in which the magnetic head slider 50 is mounted thereto, moment of force per unit angle (rad) was calculated by the finite element method based on a displacement amount by which the magnetic head slider 50 is displaced in the pitch direction when applying loads of 1 mgf, which have opposite directions to each other in Z direction orthogonal to the disk surface, to the distal side and the proximal side of the magnetic head slider 50 in its longitudinal direction, and the moment of force per unit angle (rad) that was calculated was regarded as the pitch rigidity.

Regarding the roll rigidity, in each of the models of the examples 1 to 3 in which the magnetic head slider 50 is mounted, moment of force per unit angle (rad) was calculated by the finite element method based on a displacement amount by which the magnetic head slider 50 is displaced in the roll direction when applying loads of 1.0 mgf, which have opposite directions to each other in Z direction orthogonal to the disk surface, to one side and the other side of the magnetic head slider 50 in its width direction, and the moment of force per unit angle (rad) that was calculated was regarded as the roll rigidity.

Figure 10:
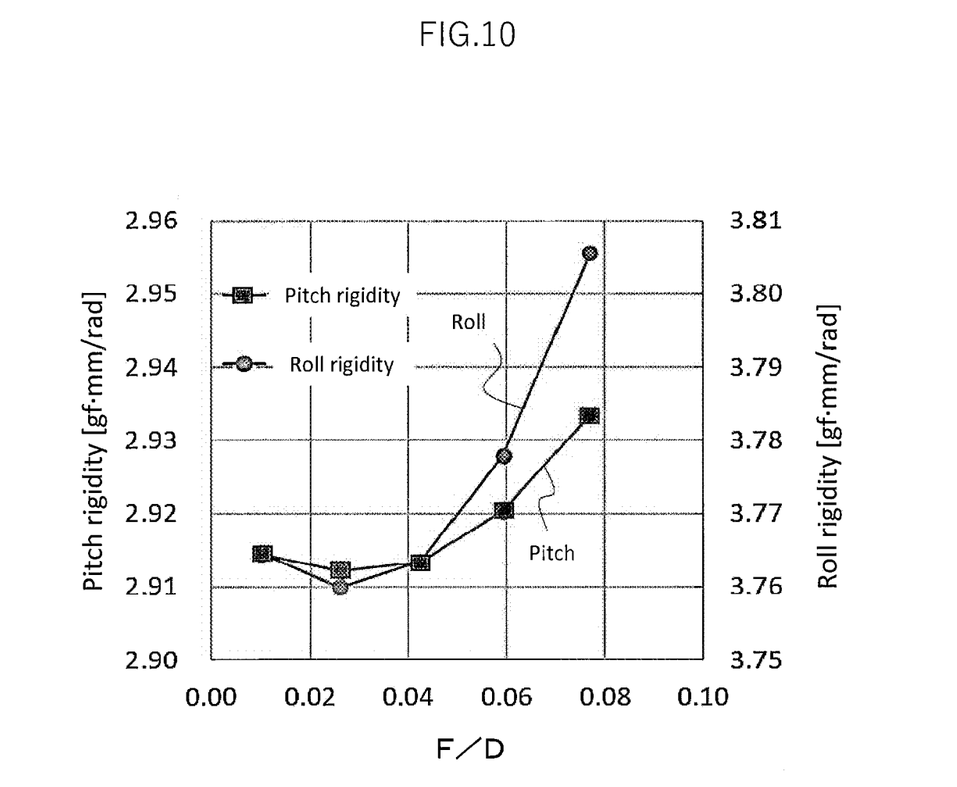
FIG. 10 is a graph of a result of a verification 3 performed on the example of the magnetic head suspension, and shows a relationship between F/D and a pitch rigidity and a roll rigidity of a tongue region.

FIG. 10 shows a relationship between F/D and the pitch rigidity and the roll rigidity.

In order to improve a trucking ability of the magnetic head slider 50 with respect to the disk surface, it is preferable to reduce the pitch rigidity and the roll rigidity of the tongue region 415.

Taking it into consideration, it is understandable from FIG. 10 that F/D having a range of 0.01-0.05 is preferable.

Based on the results of the verifications 1 to 3, it is preferable that the suspension is configured so that F/D is within a range of 0.02-0.05, and is more preferable that the suspension is configured so that F/D is within a range of 0.04-0.05.

1 magnetic head suspension
10 supporting part
20 load bending part
30 load beam part
31 main body portion
32 flange portion
33 dimple
35 LB bending position
40 flexure part
50 magnetic head slider
91 F/L first welding point
92 F/L second welding point
95 supporting arm welding point
410 flexure substrate plate
411 main body region
412 supporting arm
412a bending portion
415 tongue region
CL suspension longitudinal center line

What is claimed is:

1. A magnetic head suspension including an overlapped assembly that has a load beam part and a flexure part fixed to the load beam part, the overlapped assembly being bent at a predetermined LB bending position between distal and proximal ends of the overlapped assembly so that a distal side of the overlapped assembly is separated from a disk surface,
   wherein the flexure part has a metal flexure substrate plate,
   wherein the flexure substrate plate has a main body region fixed to the load beam part, a pair of right and left supporting arms extending toward a distal side from the main body region in a state of being free from the load beam part, and a tongue region supported directly or indirectly by the pair of supporting arms,
   wherein the main body region is fixed to the load beam part at plural welding points including F/L first and second welding points that are arranged on a distal side and a proximal side of the LB bending position in a suspension longitudinal direction, respectively,
   wherein the pair of supporting arms have distal ends that are fixed to the load beam part at a supporting arm welding point arranged on a distal side of the tongue region in the suspension longitudinal direction,
   wherein the tongue region is arranged between the F/L first welding point and the supporting arm welding point in the suspension longitudinal direction, and is configured to have a lower surface, which faces the disk surface, supporting the magnetic head slider and an upper surface, which is opposite from the disk surface, brought into contact with a dimple provided in the load beam part, and
   wherein, in a case where a length of a flat region in the suspension longitudinal direction is represented by F, the flat region extending between an end position on the distal side in the suspension longitudinal direction of the bending at the LB bending position and the F/L first welding point, and a length between the F/L first welding point and the supporting arm welding point in the suspension longitudinal direction is represented by D, a condition of $0.02 \leq F/D \leq 0.05$ is met.

2. The magnetic head suspension according to claim 1, wherein the load beam part includes a plate-like main body portion having a width that is gradually reduced from a proximal side to a distal side in the suspension longitudinal direction, and a pair of right and left flange portions extending from both side edges of the main body portion in a suspension width direction toward a direction away from the disk surface, and
   wherein the main body region is fixed to the main body portion at the F/L first and second welding points, and the pair of supporting arms are fixed to the main body portion at the supporting arm welding.

3. The magnetic head suspension according to claim 1, wherein the pair of supporting arms each have a bending portion that has a convex shape towards the disk surface and is arranged on a proximal side of the tongue region in the suspension longitudinal direction.

4. The magnetic head suspension according to claim 1, wherein a condition of $0.04 \leq F/D \leq 0.05$ is met.

5. The magnetic head suspension according to claim 4, wherein the supporting arm welding is arranged on a suspension longitudinal center line.

6. The magnetic head suspension according to claim 5, wherein the F/L first welding point includes a pair of welding points arranged symmetrically with respect to the suspension longitudinal center line CL.

* * * * *